US006541409B1

United States Patent
Jones et al.

(10) Patent No.: US 6,541,409 B1
(45) Date of Patent: Apr. 1, 2003

(54) PROCESS FOR PRODUCING ANIONIC CLAY USING NON-PEPTIZED BOEMITE AND COMPOSITIONS PRODUCED THEREFROM

(75) Inventors: William Jones, Cambridge (GB); Dennis Stamires, Newport Beach, CA (US); Michael Brady, Studio City, CA (US)

(73) Assignee: Akzo Nobel N.V. (NL)

(*) Notice: Subject to any disclaimer, the term of this patent is extended or adjusted under 35 U.S.C. 154(b) by 0 days.

(21) Appl. No.: 09/491,263

(22) Filed: Jan. 26, 2000

Related U.S. Application Data

(63) Continuation-in-part of application No. 09/250,346, filed on Feb. 16, 1999, now abandoned.
(60) Provisional application No. 60/117,933, filed on Jan. 29, 1999.

(51) Int. Cl.$^7$ .......................... B01J 21/16; C04B 35/03; C04B 35/04; C04B 33/00; C04B 35/10
(52) U.S. Cl. .............. 502/84; 502/80; 502/81; 501/108; 501/127; 501/141; 501/153
(58) Field of Search .................. 502/80, 81, 84; 501/108, 127, 128, 129, 130, 133, 141, 153, 154

(56) References Cited

U.S. PATENT DOCUMENTS

| | | | | |
|---|---|---|---|---|
| 3,796,792 A | | 3/1974 | Miyata et al. | 423/250 |
| 3,844,978 A | * | 10/1974 | Hickson | 252/455 R |
| 3,844,979 A | * | 10/1974 | Hickson | 252/455 R |

(List continued on next page.)

FOREIGN PATENT DOCUMENTS

| | | | | |
|---|---|---|---|---|
| EP | 0 536 879 | 4/1993 | | C01G/1/00 |
| WO | WO/91/10505 | 7/1991 | | B01J/8/00 |
| WO | WO98/03430 | 1/1998 | | C01F/7/00 |
| WO | WO98/51615 | 11/1998 | | C01F/7/00 |

OTHER PUBLICATIONS

*Materials Chemistry and Physics, Textural Properties of Hydrotalcite–Like Compounds* . . . 14, pp. 569–579 (1986).
*Clays and Clay Minerals, Syntheses of Disordered and A1–Rich Hydrotalcite–Like Compounds* 34, pp. 507–510, vol. 34, No. 5, (1986).
*Clays and Clay Minerals*, Physico–Chemical Properties of Synthetic Hydrotalcites in Relation to Composition, vol. 28, No. 1, pp. 50–56 (1980).
*Clays and Clay Minerals, The Syntheses of Hydrotalite–Like Compounds and Their Structures and Physico–Chemical* . . . , vol. 23, pp. 369–375, (1975).
*J. Am. Ceram. Soc., Studies on 4CaO–A1$_{2il}$ $_{O_3}$—13H$_2$O and the Related Natural Mineral Hydrocalumite* 42, No. 3, pp. 121–126, (1959).
*Chemistry Letters, Synthesis of New Hydrotalcit–Like Compounding and Their Physico–Chemical Properties*, pp. 843–848, (1973).
*Anionic Clays: trends in pillary chemistry, its synthesis and microporous solids* (1992), 2, pp. 108–165.
*Catalysis Today, Hydrotalcity–Type Anionic Clays: Preparation, Properties and Applications* 11, pp. 173–301, (1991).
*Hel. Chim. Acta*, 25 pp. 106–137 and 555–569 (1942).

Primary Examiner—Stanley S. Silverman
Assistant Examiner—Cam N. Nguyen
(74) *Attorney, Agent, or Firm*—Louis A. Morris

(57) ABSTRACT

An economical and environment-friendly processes for the synthesis of anionic clays and the products made therefrom. It involves reacting a slurry comprising non-peptized boehmite with a magnesium source. There is no necessity to wash or filter the product. It can be spray dried directly to form microspheres or can be extruded to form shaped bodies. The product can be combined with other ingredients in the manufacture of catalysts, absorbents, pharmaceuticals, cosmetics, detergents, and other commodity products that contain anionic clays.

12 Claims, 9 Drawing Sheets

U.S. PATENT DOCUMENTS

| | | | | |
|---|---|---|---|---|
| 3,879,523 A | | 4/1975 | Miyata et al. | 423/250 |
| 3,879,525 A | | 4/1975 | Miyata et al. | 423/277 |
| 4,351,814 A | | 9/1982 | Miyata et al. | 423/306 |
| 4,458,026 A | | 7/1984 | Reichle | 502/80 |
| 4,656,156 A | | 4/1987 | Misra | 502/415 |
| 4,774,212 A | * | 9/1988 | Drezdon | 502/62 |
| 4,904,457 A | | 2/1990 | Misra | 423/115 |
| 4,946,581 A | | 8/1990 | van Broekhoven | 208/120 |
| 4,952,382 A | | 8/1990 | van Broekhoven | 423/244 |
| 4,970,191 A | * | 11/1990 | Schutz | 502/341 |
| 5,055,620 A | * | 10/1991 | Schutz | 568/353 |
| 5,064,804 A | * | 11/1991 | Soo et al. | 502/335 |
| 5,079,203 A | | 1/1992 | Pinnavaia et al. | 502/84 |
| 5,089,458 A | * | 2/1992 | Breukelaar et al. | 502/63 |
| 5,104,987 A | | 4/1992 | King | 544/401 |
| 5,112,784 A | * | 5/1992 | Atkins et al. | 502/80 |
| 5,114,898 A | | 5/1992 | Pinnavaia et al. | 502/406 |
| 5,153,156 A | * | 10/1992 | Schutz et al. | 502/63 |
| 5,202,496 A | * | 4/1993 | Schutz et al. | 568/388 |
| 5,214,142 A | * | 5/1993 | King | 544/111 |
| 5,247,103 A | * | 9/1993 | King et al. | 549/510 |
| 5,260,495 A | * | 11/1993 | Forkner | 568/867 |
| 5,399,329 A | * | 3/1995 | Schutz et al. | 423/415.1 |
| 5,399,537 A | | 3/1995 | Bhattacharyya et al. | 502/84 |
| 5,407,652 A | * | 4/1995 | Swamy et al. | 423/239.1 |
| 5,439,861 A | | 8/1995 | Bhattachayya et al. | 502/84 |
| 5,472,677 A | * | 12/1995 | Farris et al. | 423/239.1 |
| 5,474,602 A | * | 12/1995 | Brown et al. | 106/18.26 |
| 5,507,980 A | | 4/1996 | Kelkar et al. | 264/15 |
| 5,518,704 A | * | 5/1996 | Kellar et al. | 423/420.2 |
| 5,578,286 A | | 11/1996 | Martin et al. | 423/593 |
| 5,591,418 A | | 1/1997 | Bhattacharyya et al. | 423/239 |
| 5,603,823 A | * | 2/1997 | Kim | 208/113 |
| 5,814,291 A | * | 9/1998 | Kellar | 423/395 |
| 6,028,023 A | * | 2/2000 | Vierheilig | 502/84 |

* cited by examiner

Figure 1(a) Catapal
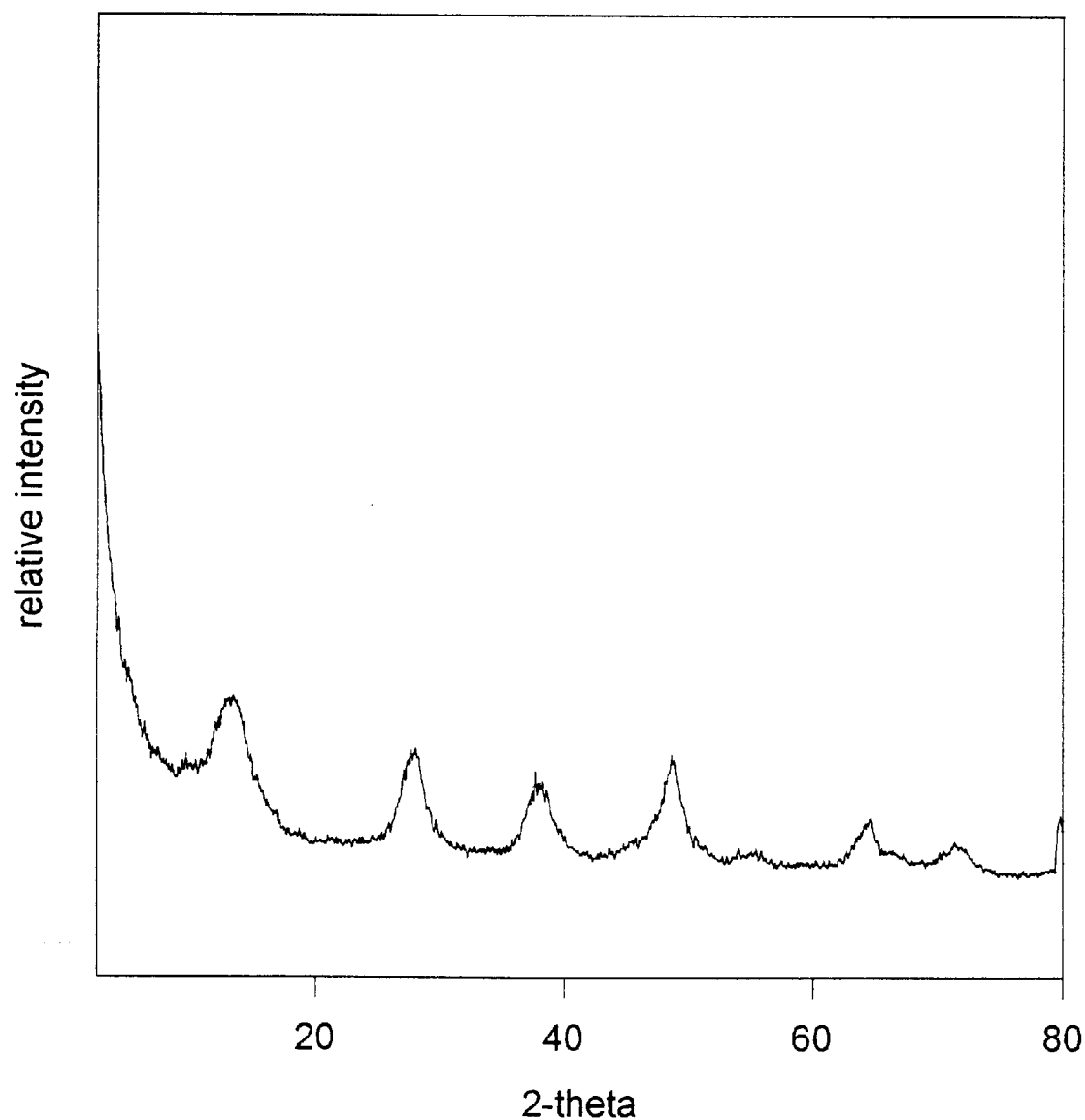

Figure 1(b) P3 alumina
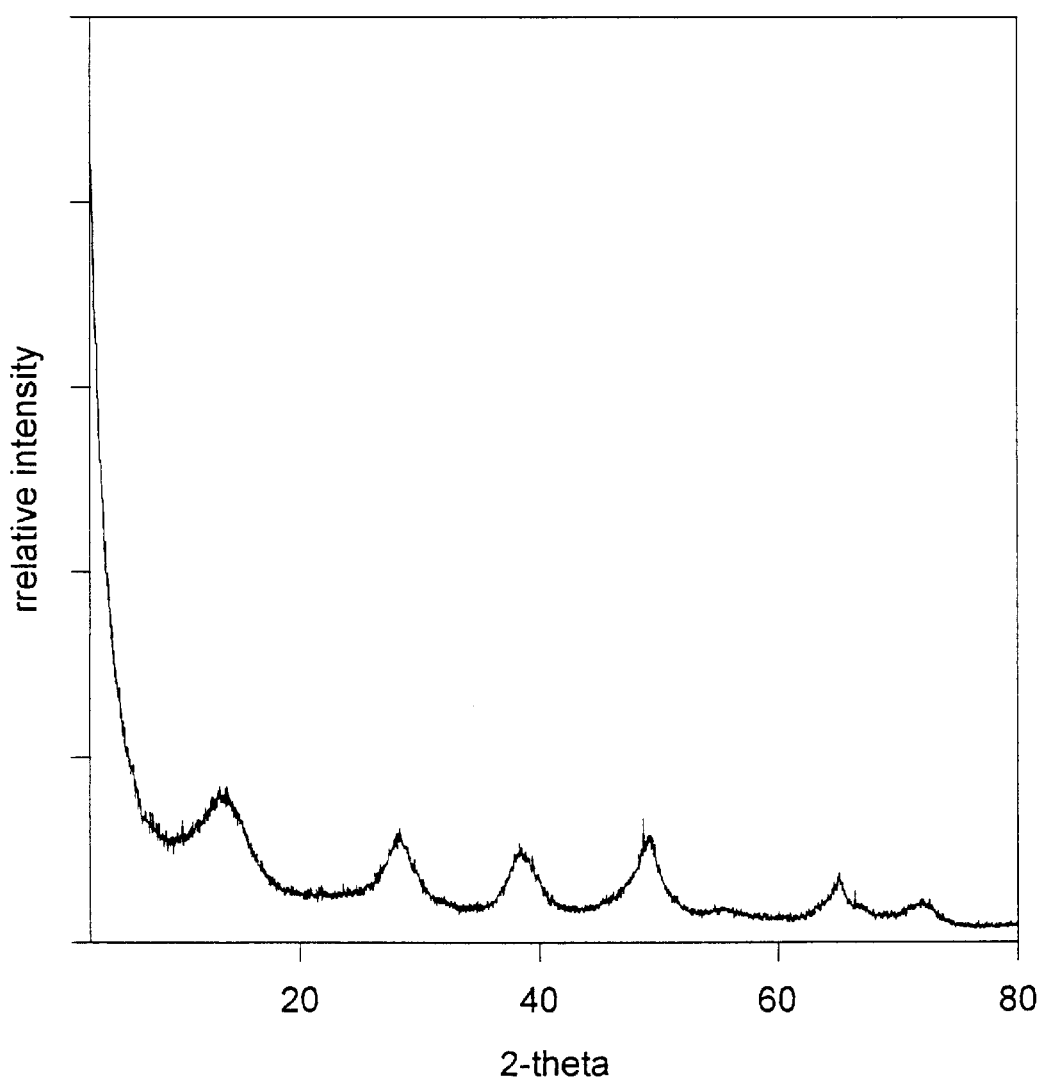

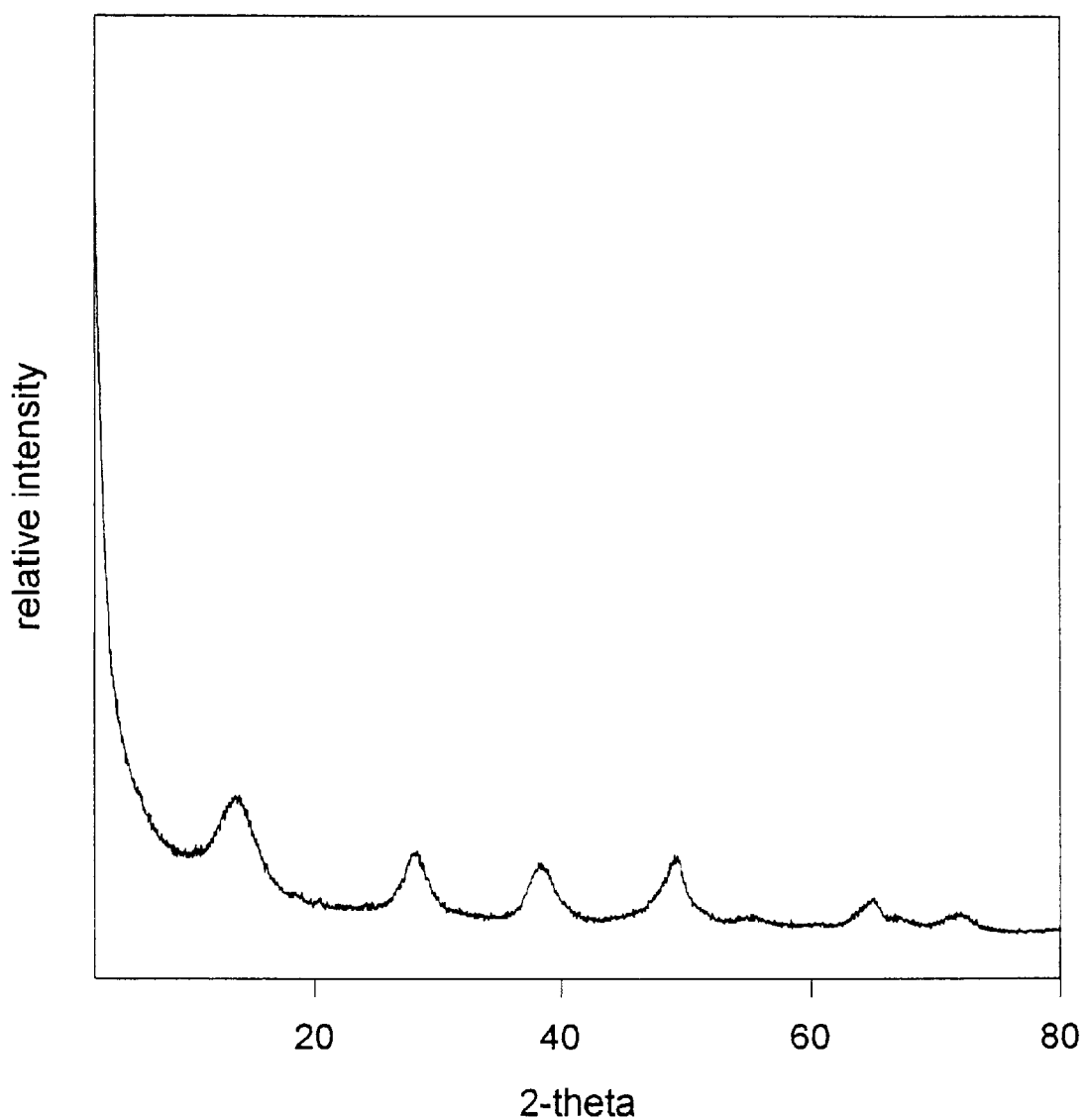
Figure 1(c) Laroche alumina

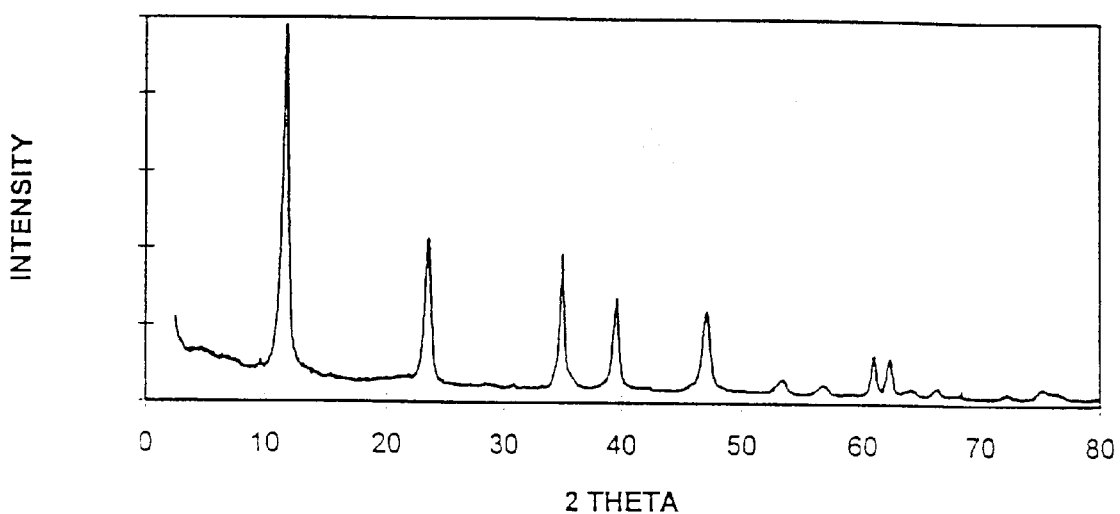
FIGURE 2: X-RAY DIFFRACTION PATTERN FOR COMMERCIAL ANIONIC CLAY
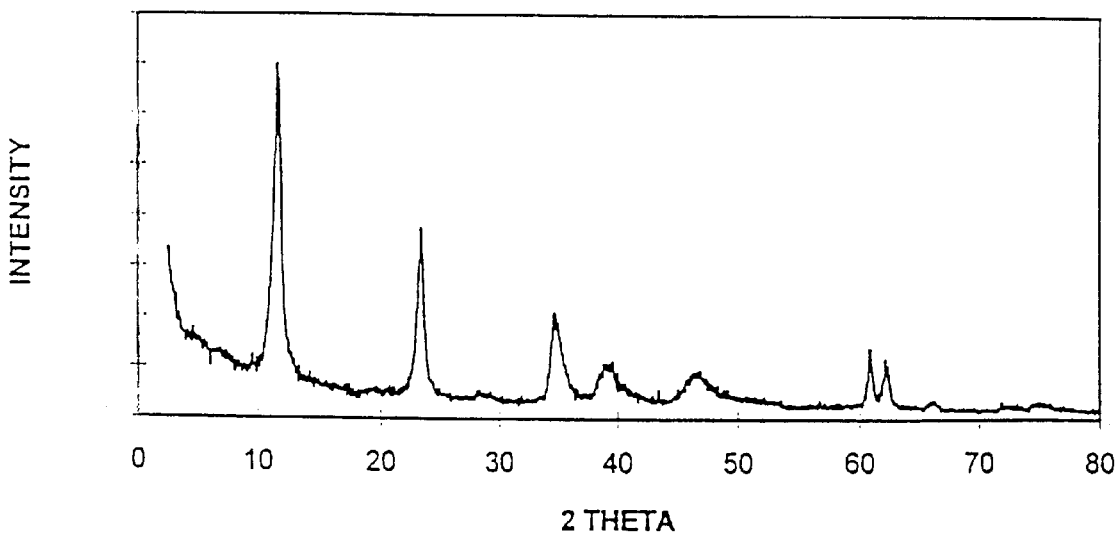
FIGURE 3: X-RAY DIFFRACTION PATTERN FOR ANIONIC CLAY MADE BY CO-PRECIPITATION

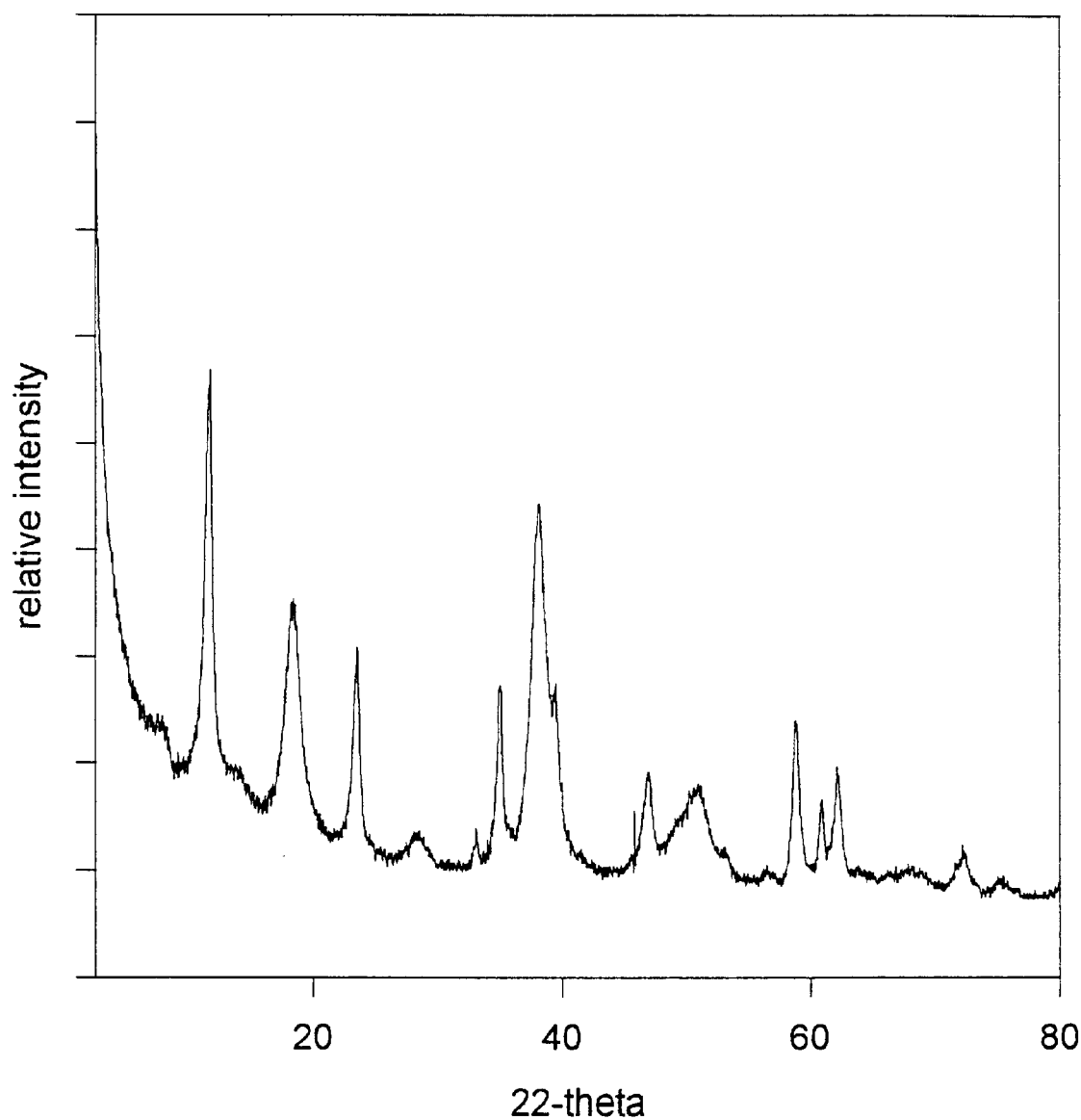
Figure 4 (Catapal + MgO)

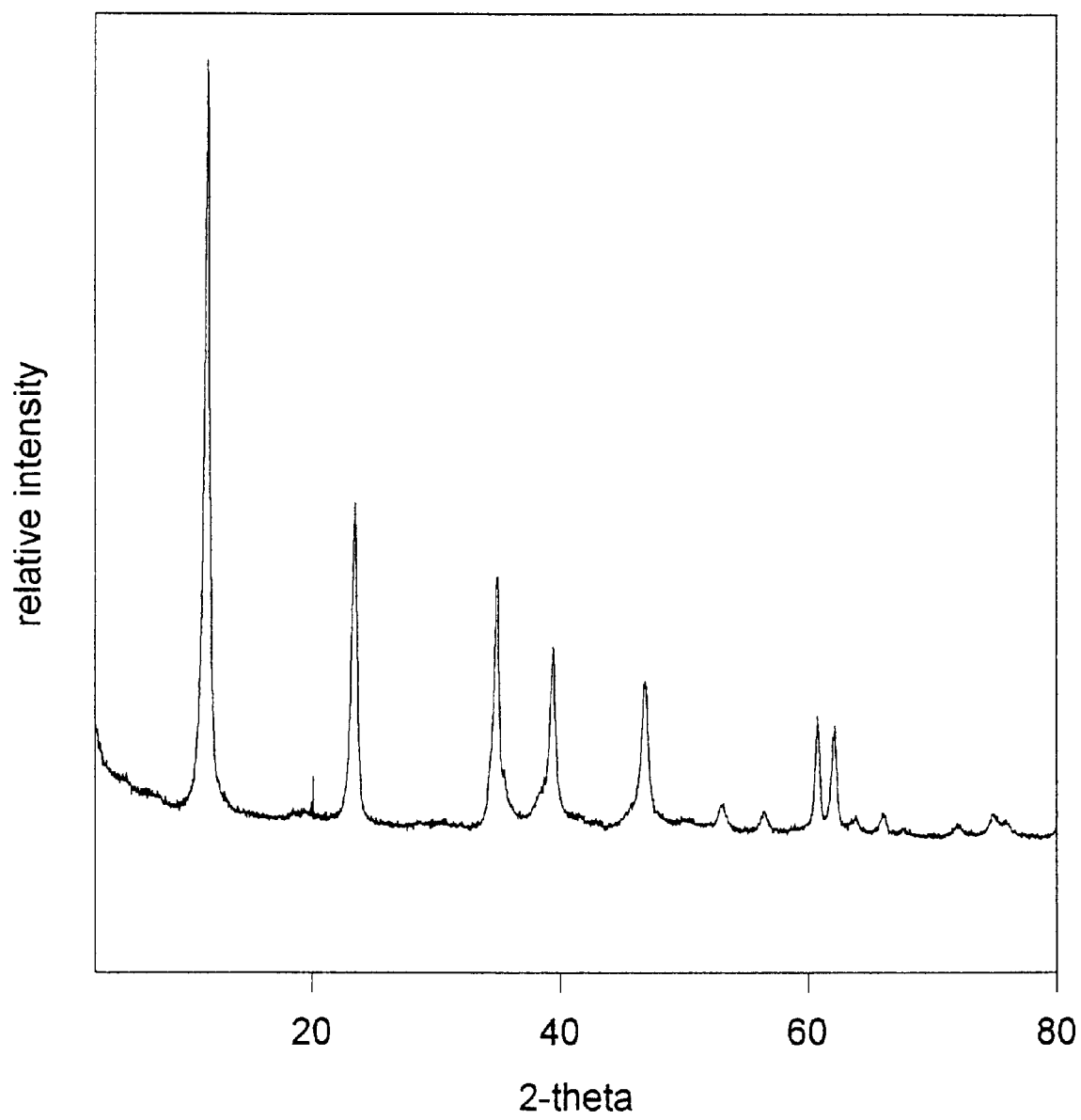
Figure 5 (Catapal + MgO)

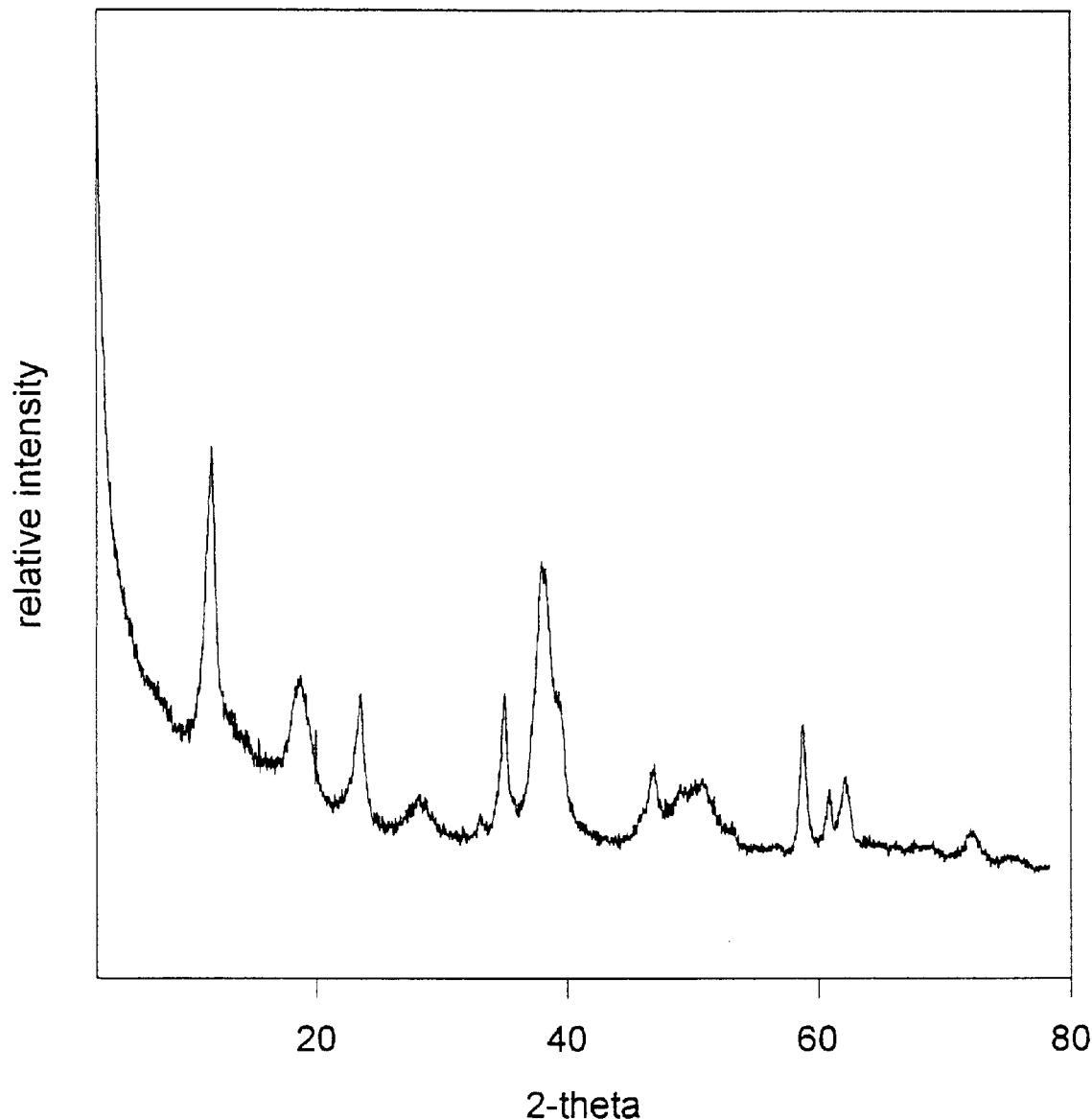
Figure 6 (Laroche + MgO)

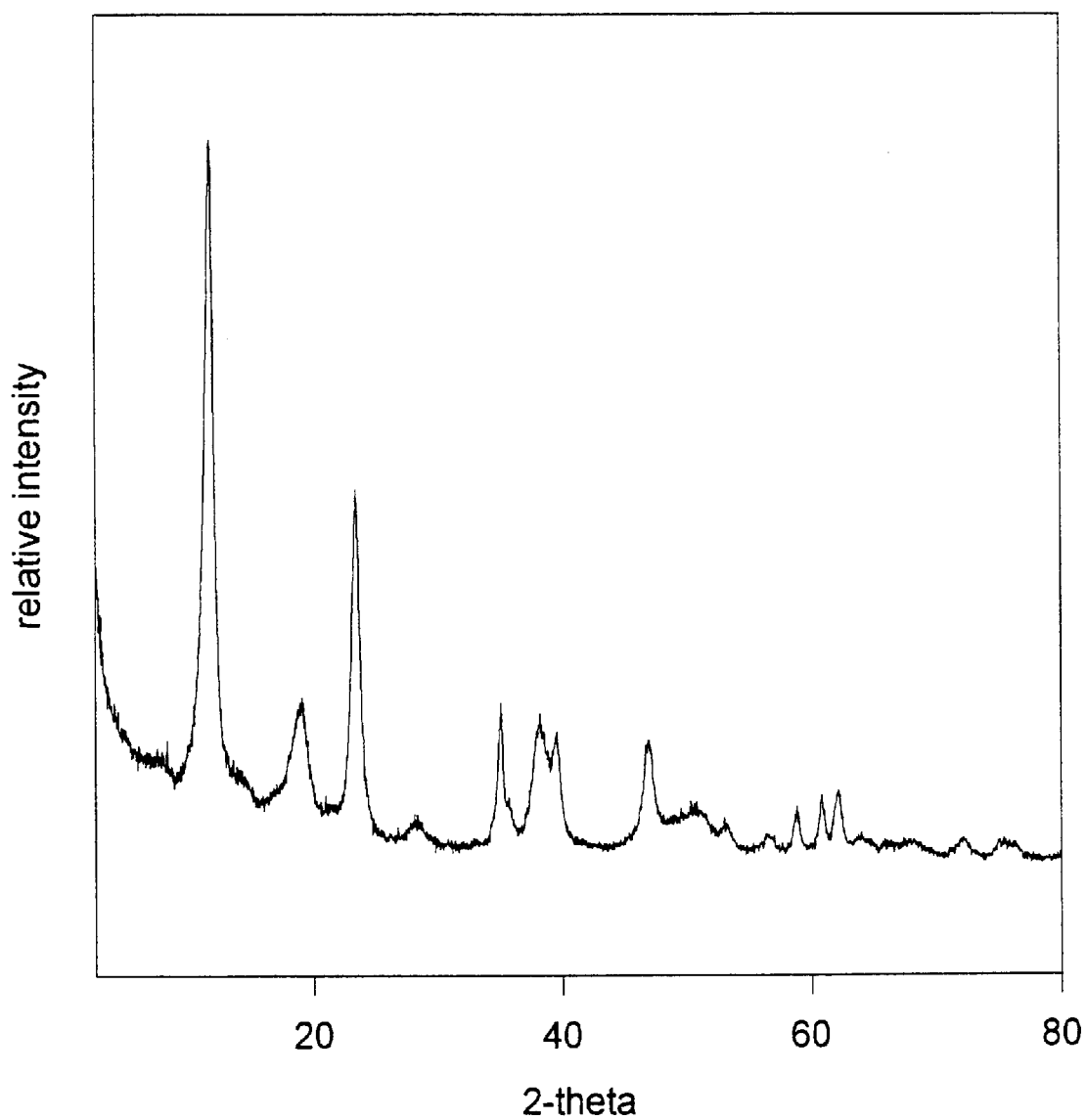
Figure 7 (P3 + MgO)

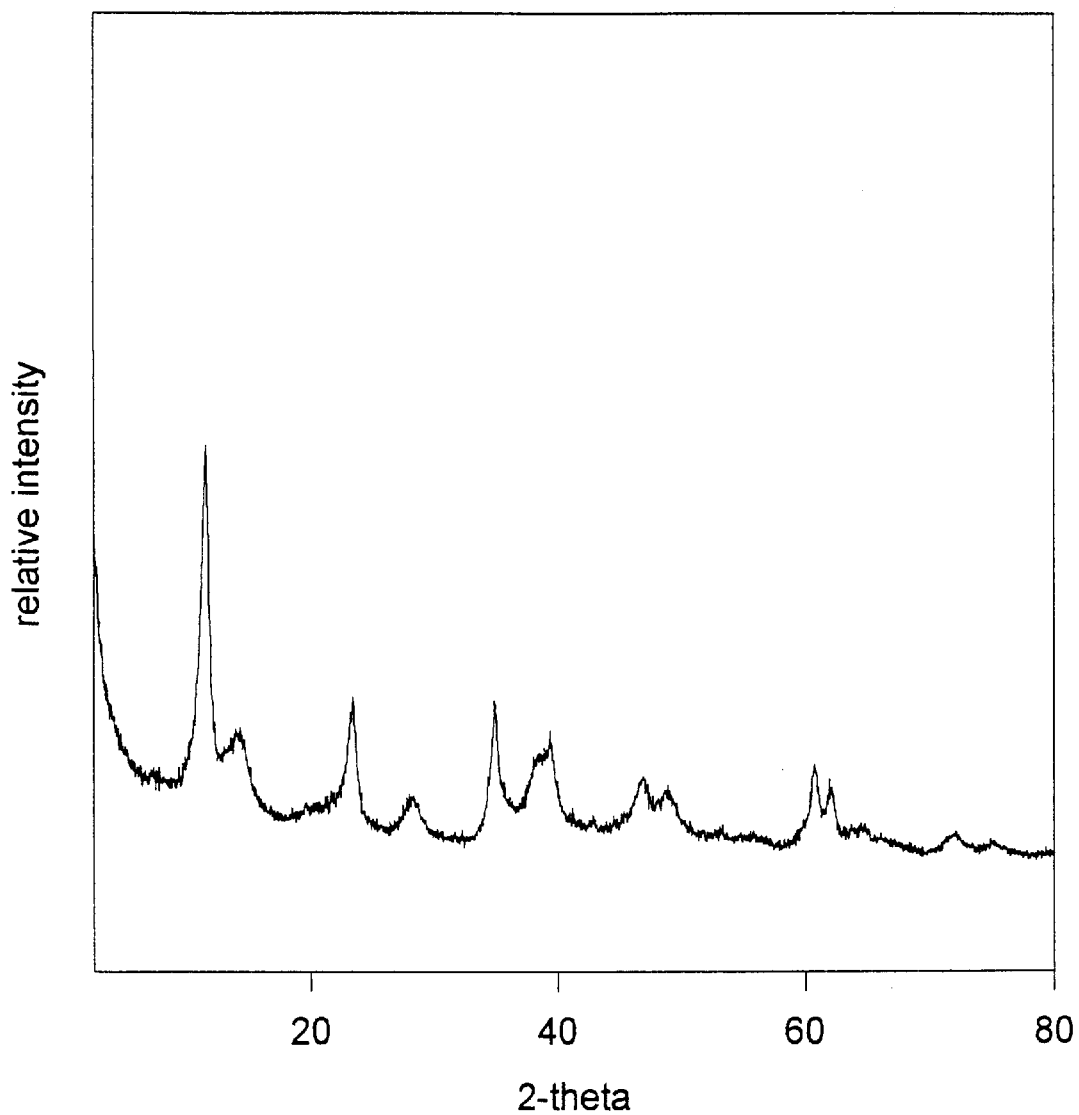
Figure 8 (P3 + MgO)

PROCESS FOR PRODUCING ANIONIC CLAY USING NON-PEPTIZED BOEMITE AND COMPOSITIONS PRODUCED THEREFROM

RELATED APPLICATIONS

The present application is, a continuation-in-part of Ser. No. 09/250,346, filed Feb. 16, 1999, now abandoned which claims priority of U.S. Provisional Patent Application Ser. No. 60/117,933, tiled Jan. 29, 1999.

BACKGROUND OF THE INVENTION

1. Field of the Invention

This invention involves the preparation of anionic clays and the preparation of Mg—Al solid solutions by heat-treatment of the anionic clay.

2. Prior Art

Anionic clays have a crystal structure which consists of positively charged layers built up of specific combinations of metal hydroxides between which there are anions and water molecules. Hydrotalcite is an example of a naturally occurring anionic clay, in which carbonate is the predominant anion present. Meixnerite is an anionic clay wherein $OH^-$ is the predominant anion present.

In hydrotalcite-like anionic clays the brucite-like main layers are built up of octahedra alternating with interlayers in which water molecules and anions, more particularly carbonate ions, are distributed. The interlayers contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{-6}$ and $MO_7O_{24}^{6-}$, mono-carboxylates such as acetate, dicarboxylates such as oxalate, alkyl sulphonates such as laurylsulphonate.

It should be noted that a variety of terms are used to describe the material that is referred to in this patent as an anionic clay. Hydrotalcite-like and layered double hydroxide are interchangeably used by those skilled in the art. In this patent application we refer to the materials as anionic clays, comprising within that term hydrotalcite-like and layered double hydroxide materials.

The preparation of anionic clays has been described in many prior art publications. Recently, two major reviews of anionic clay chemistry were published in which the synthesis methods available for anionic clay synthesis have been summarized, F. Cavani et al "Hydrotalcite-type anionic clays: Preparation, Properties and Applications," *Catalysis Today*", 11 (1991) Elsevier Science Publishers B. V. Amsterdam. J P Besse and others "*Anionic clays:trends in pillary chemistry, its synthesis and microporous solids*"(1992), 2, 108, editors: M. I. Occelli, H. E. Robson, Van Nostrand Reinhold, N.Y.

In these reviews the authors state that a characteristic of anionic clays is that mild calcination at 500° C. results in the formation of a disordered MgO-like product. Said disordered MgO-like product is distinguishable from spinel (which results upon severe calcination) and from anionic clays. In this patent application we refer to said disordered MgO-like materials as Mg—Al solid solutions. Furthermore, these Mg—Al solid solitions contain a well-known memory effect whereby the exposure to water of such calcined materials results in the reformation of the anionic clay structure.

For work on anionic clays, reference is given to the following articles:
*Helv. Chim. Acta*, 25, 106–137 and 555–569 (1942)
*J. Am. Ceram. Soc.*, 42, no. 3, 121 (1959)
*Chemistry Letters (Japan)*, 843 (1973)
*Clays and Clay Minerals*, 23, 369 (1975)
*Clays and Clay Minerals*, 28, 50 (1980)
*Clays and Clay Minerals*, 34, 507 (1996)
*Materials Chemistry and Physics*, 14, 569 (1986).

In addition there is an extensive amount of patent literature on the use of anionic clays and processes for their preparation. European Patent Application 0 536 879 describes a method for introducing pH-dependent anions into the clay. The clay is prepared by the addition of a solution of $Al(NO_3)_3$ and $Mg(NO_3)_2$ to a basic solution containing borate anions. The product is then filtered, washed repeatedly with water, and dried overnight. Additionally mixtures of Zn/Mg are used.

In U.S. Pat. No. 3,796,792 by Miyata et al. entitled "Composite Metal Hydroxides" a range of materials is prepared into which an extensive range of cations is incorporated, including Sc, La, Th, In, etc. In the examples given solutions of the divalent and trivalent cations are prepared and mixed with base to cause co-precipitation. The resulting products are filtered, washed with water, and dried at 80° C. Example 1 refers to Mg and Sb and Example 3 to Mg and Bi. Other examples are given, and in each case soluble salts are used to make solutions prior to precipitation of the anionic clay at high pH.

In U.S. Pat. No. 3,879,523 by Miyata entitled "Composite Metal Hydroxides" also a large number of preparation examples is outlined. The underlying chemistry, however, is again based on the co-precipitation of soluble salts followed by washing and drying. It is important to emphasize that washing is a necessary part of such preparations, because to create a basic environment for co-precipitation of the metal ions a basic solution is needed and this is provided by $NaOH/Na_2CO_3$ solutions. Residual sodium, for example, can have a significant deleterious effect on the subsequent performance of the product as a catalyst or oxide support.

In U.S. Pat. No. 3,879,525 (Miyata) very similar procedures are again described.

In U.S. Pat. No. 4,351,814 to Miyata et al. a method for making fibrous hydrotalcites is described. Such materials differ in structure from the normal plate-like morphology. The synthesis again involves soluble salts. For example, an aqueous solution of a mixture of $MgCl_2$ and $CaCl_2$ is prepared and suitably aged. From this a needle-like product $Mg_2(OH)_3Cl.4H_2O$ precipitates. A separate solution of sodium aluminate is then reacted in an autoclave with the solid $Mg_2(OH)_3Cl.4H_2O$ and the product is again filtered, washed with water, and dried.

In U.S. Pat. No. 4,458,026 to Reichle, in which heat-treated anionic clays are described as catalysts for aldol condensation reactions, again use is made of magnesium and aluminium nitrate salt solutions. Such solutions being added to a second solution of NaOH and $Na_2CO_3$. After precipitation the slurry is filtered and washed twice with distilled water before drying at 125° C.

In U.S. Pat. No. 4,656,156 to Misra the preparation of a novel absorbent based on mixing activated alumina and hydrotalcite is described. The hydrotalcite is made by reacting activated MgO (prepared by activating a magnesium compound such as magnesium carbonate or magnesium hydroxide) with aqueous solutions containing aluminate, carbonate and hydroxyl ions. As an example the solution is made from NaOH, $Na_2CO_3$ and $Al_2O_3$. In particular, the synthesis involves the use of industrial Bayer liquor as the source of Al. The resulting products are washed and filtered before drying at 105° C.

In U.S. Pat. No. 4,904,457 to Misra a method is described for producing hydrotalcites in high yield by reacting activated magnesia with an aqueous solution containing aluminate, carbonate, and hydroxyl ions.

The methodology is repeated in U.S. Pat. No. 4,656,156.

In U.S. Pat. No. 5,507,980 to Kelkar et at al. a process is described for making novel catalysts, catalyst supports, and absorbers comprising synthetic hydrotalcite-like binders. The synthesis of the typical sheet hydrotalcite involves reacting pseudo-boehmite to which acetic acid has been added to peptize the pseudo-boehmite. This is then mixed with magnesia. More importantly, the patent summary states clearly that the invention uses mono carboxylic organic acids such as formic, propionic and isobutyric acid. In this patent the conventional approaches to preparing hydrotalcites are presented.

In U.S. Pat. No. 5,439,861 a process is disclosed for preparing a catalysts for synthesis gas production based on hydrotalcites. The method of preparation is again based, on the co-precipitation of soluble salts by mixing with base, for example, by the addition of a solution of $RhCl_3$, $Mg(NO_3)_2$ and $Al(NO_3)_3$ to a solution of $Na_2CO_3$ and NaOH.

Also in U.S. Pat. No. 5,399,537 to Bhattacharyya in the preparation of nickel-containing catalysts based on hydrotalcite use is made of the co-precipitation of soluble magnesium and aluminium salts.

In U.S. Pat. No. 5,591,418 to Bhattacharyya a catalyst for removing sulfur oxides or nitrogen oxides from a gaseous mixture is made by calcining an anionic clay, said anionic clay having been prepared by co-precipitation of a solution of $Mg(NO_3)_2$, $Al(NO_3)_3$ and $Ce(NO_3)_3$. The product again is filtered and repeatedly washed with de-ionized water.

In U.S. Pat. No. 5,114,898/WO 9110505 Pinnavaia et al. describe layered double hydroxide sorbents for the removal of sulfur oxide(s) from flue gases, which layered double hydroxide is prepared by reacting a solution of Al and Mg nitrates or chlorides with a solution of NAOH and $Na_2CO_3$. In U.S. Pat. No. 5,079,203/WO 9118670 layered double hydroxides intercalated with polyoxo anions are described, with the parent clay being made by co-precipitation techniques.

In U.S. Pat. No. 5,578,286 in the name of Alcoa a process for the preparation of meixnerite is described. Said meixnerite may be contacted with a dicarboxylate or polycarboxylate anion to form a hydrotalcite-like material. In examples 5–6 hydromagnesite is contacted with pseudoboehmite under high $CO_2$ pressure to obtain hydrotalcite.

In U.S. Pat. Nos. 4,946,581 and 4,952,382 to van Broekhoven co-precipitation of soluble salts such as $Mg(NO_3)_2$ and $Al(NO_3)_3$ with, and without the incorporation of rare earth salts was used for the preparation of anionic clays as catalyst components and additives. A variety of anions and di- and tri-valent cations are described.

As indicated in the description of the prior art givenabove, there are many applications of anionic clays. These include but are not restricted to: catalysts, adsorbents, drilling muds, catalyst supports and carriers, extenders and applications in the medical field. In particular van Broekhoven has described their use in $SO_x$ abatement chemistry.

Because of this wide variety of large-scale commercial applications for these materials, new processes utilizing alternative inexpensive raw materials are needed to provide a more cost-effective and environmentally compatible processes for making anionic clays. In particular, from the prior art described above one can conclude that the preparation process can be improved in the following ways: the use of cheaper sources of reactants, processes for easier handling of the reactants, so that there is no need for washing or filtration, eliminating the filtration problems associated with these fine-particled materials, the avoidance of alkali metals (which can be particularly disadvantageous for certain catalytic applications): In prior art preparations, organic acids were used to peptize alumina. The use of organic acids is expensive and introduces an additional step in the synthesis process and is therefore not cost-effective. Further, in drying or calcining the anionic clay prepared by prior art processes gaseous emissions of nitrogen oxides, halogens, sulfur oxides, etc. are encountered which cause environmental pollution problems.

SUMMARY OF THE INVENTION

Accordingly, the objectives of our invention are to provide processes for producing anionic clays using novel raw materials and utilizing such raw materials in a simple process which involves reacting mixtures with or without stirring in water at ambient or elevated temperature at atmospheric or elevated pressure. Such processes can be operated in standard laboratory/industrial equipment. More specifically, there is no need for washing or filtering, and a wide range of ratios of Mg/Al in the reaction product is possible.

In brief summary, in one embodiment, the present invention comprises a process for the preparation of anionic clays wherein a slurry comprising boehmite and magnesium source not being hydromagnesite is reacted to obtain an anionic clay.

In another embodiment, the present invention comprises a process for the preparation of a composition containing anionic clay and boehmite wherein a slurry comprising boehmite and magnesium source is reacted to obtain a composition comprising anionic clay and boehmite.

Other embodiments encompass compositions prepared by the above processes as well as compositions containing anionic clay and boehmite in an intimate mixture, anionic clay and a magnesium compound in an intimate mixture and/or anionic clay, magnesium compound and boehmite in an intimate mixture.

BRIEF DESCRIPTION OF THE DRAWINGS

FIG. 1(a) shows a PXRD pattern of commercially available Catapal®.

FIG. 1(b) shows a PXRD pattern of commercially available P3® alumina.

FIG. 1(c) shows a PXRD pattern of commercially available Laroche® alumina.

FIG. 2. shows a PXRD pattern of a commercially available anionic clay.

FIG. 3 shows a PXRD pattern of a Mg—Al carbonate anionic clay prepared by coprecipitation.

FIG. 4 shows a PXRD pattern of an anionic clay prepared by the process according to the invention, wherein Catapal® and MgO are reacted.

FIG. 5 shows a PXRD pattern of an anionic clay prepared by the process according to the invention, wherein MgO and Catapal® are reacted.

FIG. 6 shows a PXRD pattern of an anionic clay prepared by the process according to the invention, wherein MgO and Laroche® alumina are reacted.

FIG. 7 shows a PXRD pattern of an anionic clay prepared by the process according to the invention, wherein MgO and P3® alumina are reacted.

FIG. 8 shows a PXRD pattern of an anionic clay prepared by the process according to the invention, wherein MgO and P3® alumina are reacted.

DETAILED DESCRIPTION OF THE INVENTION

This invention involves the use of boehmite in aqueous suspensions, where at ambient or elevated temperature magnesium sources, for instance MgO or brucite, are added and the reaction mixture results in the direct formation of an anionic clay. The powder X-ray diffraction pattern (PXRD) suggests that the product is comparable to anionic clays made by other standard methods. The physical and chemical properties of the product are also comparable to those anionic clays made by the other conventional methods. The overall process of this invention is very flexible, enabling a wide variety of anionic clay compositions and anionic clay-like materials involving for example carbonate, hydroxide and other anions to be prepared in an economically and environmental-friendly manner. The process may be carried out in a one-step process either in batch or in continuous mode.

This invention involves the preparation of anionic clays. In particular it describes a process for the preparation of an anionic clay by reacting a slurry comprising boehmite and a magnesium source not being hydromagnesite. Hydromagnesite is a carbonate-containing Mg-source which is expensive and not readily available. Further, hydromagnesite appears to be less reactive for the present process than the magnesium sources of the present invention. Said magnesium source may be composed of a solution of a magnesium salt, a solid magnesium-bearing compound or a mixture of the two.

Reaction between the Mg source and boehmite results in the direct formation of an anionic clay. Said reaction takes place at room temperature or higher. At temperatures higher than 100° C., the reaction is preferably carried out under autogeneous conditions. In the method according to the invention carbonate, hydroxyl, or other anions or mixtures thereof, either provided within the reaction medium for example as a soluble salt or absorbed during the synthesis from the atmosphere, are incorporated into the interlayer region as the necessary charge-balancing anion.

Anionic clays prepared by this method exhibit the well known properties and characteristics (e.g. chemical analysis, powder X-ray diffraction pattern, FTIR, thermal decomposition characteristics, surface area, pore volume, and pore size distribution) usually associated with anionic clays prepared by the customary and previously disclosed methods.

Upon being heated, anionic clays generally form Mg—Al solid solutions, and at higher temperatures, spinels. When used as a catalyst, an adsorbent (for instance a $SO_x$ adsorbent for catalytic cracking reactions), or a catalyst support, the anionic clay according to the invention is usually heated during preparation and is thus in the Mg—Al solid solution form. During use in an FCC unit, the catalyst or adsorbent is converted from an anionic clay into Mg—Al solid solutions.

Therefore, the present invention is also directed to a process wherein an anionic clay prepared by the reaction according to the invention, is heat-treated at a temperature between 300 and 1200° C. to form a Mg—Al-containing solid solution and/or spinel.

The anionic clay according to the invention has a layered structure corresponding to the general formula $$[Mg_m^{2+}Al_n^{3+}(OH)_{2m+2n}]X_{n/z}^{z-}\cdot bH_2O$$

Wherein m and n have a value such that m/n=1 to 10, preferably 1 to 6, and b has a value in the range of from 0 to 10, generally a value of 2 to 6 and often a value of about 4. X may be $CO_3^{2-}$, $OH^-$ or any other anion normally present in the interlayers of anionic clays. It is more preferred that m/n should have a value of 2 to 4, more particularly a value close to 3.

Since the process disclosed in this patent does not require washing of the product or filtering, there is no filtrate waste or gaseous emissions (e.g. from acid decomposition), making the process particularly environmental-friendly and more suited to the environmental constraints which are increasingly imposed on commercial operations. The product can be spray dried directly to form microspheres or can be extruded to form shaped bodies.

Alumina Source

The present invention includes the use of boehmite. This includes both boehmites and pseudoboehmites such as Vista Catapal A®, Condea Dispersal P3®, Condea P200®, Laroche Versal 250® etcetera. In particular we emphasize that there is no need to peptize the boehmite. However it is permitted to peptize the boehmite with inorganic acids. These types of acids are not expensive and the use of inorganic acids renders the process still cost-effective. Our invention embodies the use of mixtures of boehmites and pseudoboehmites. Also the use of boehmites in mixture with other aluminum sources such as oxides and hydroxides of aluminum, (e.g. sols, aluminum trihydrate, and its thermally treated forms, flash calcined aluminum trihydrate), aluminum salts such as aluminum nitrate, aluminum chloride, aluminum chlorohydrate amorphous gel aluminas and sodium aluminate, is envisaged. Said other aluminum sources may be soluble or insoluble in water. Said different aluminum sources may be combined in any sequence in a slurry before and/or after the Mg source is added.

Magnesium Source

Mg-bearing sources which may be used include MgO, $Mg(OH)_2$, magnesium acetate, magnesium formate, magnesium hydroxy acetate, magnesium carbonate, magnesium bicarbonate, magnesium nitrate, magnesium chloride, dolomite, sepiolite. Preferred Mg sources are MgO, $Mg(OH)_2$, and $MgCO_3$, because they are cheap, readily available and reactive in the reaction of the present invention. Both solid Mg sources and soluble Mg salts are suitable. Also combinations of Mg sources may be used.

Conditions

All that is required is simple mixing of the Mg source and the boehmite in an aqueous suspension in air with stirring at ambient or at elevated temperature at atmospheric or elevated pressure. Usually, a temperature between 0 and 100° C. is used at or above atmospheric pressure. It is preferred to carry out the process at temperatures above 50° C. rather than at room temperature, because this results in anionic clays with sharper peaks in the x-ray diffraction pattern than anionic clays obtained at room temperature. It is possible to purge the slurry with nitrogen or inert gas if an anionic clay with predominantly hydroxide anions are desired, but in general this is not necessary. Thus, the reaction can be conducted in the presence of $CO_2$. Said $CO_2$ may be the $CO_2$ normally present in air or it may be added to the reaction from an outside source.

The aqueous suspension may be obtained by either combining slurries of the starting materials or adding magnesium source to a slurry of boehmite or vice versa. Given particular facilities which might be available, the method is suitable to use in hydrothermal processing (e.g. in an autoclave at temperatures above 100° C. and increased pressures). This is particularly advantageous, because it this is faster and a higher conversion is obtained. There is no need to wash or filter the product, as unwanted ions (e.g. sodium, ammonium, chloride, sulphate) which are frequently encountered when using other preparation methods, are absent in the product.

In a further embodiment of the invention, the process is conducted in a two-step process, e.g. a slurry of boehmite and Mg source is treated thermally at a mild temperature, followed by a hydrothermal treatment. If desired a preformed anionic clay may be added to the reaction mixture. Said preformed clay may be recycled anionic clay from the reaction mixture or anionic clay made separately by the process according to the invention or any other process.

Because of its simplicity, this process can be carried out in a continuous mode by mixing of a first slurry comprising boehmite and a second slurry comprising magnesium source passing the mixed slurry through a reactor vessel which can operate below 100° C. and under atmospheric pressure or above 100° C. under autogenous conditions. Said first and/or second slurry may be subjected to a treatment prior to mixing the slurries.

As mentioned-above, if desired inorganic acids and bases, for example for control of the pH, may be added to the slurry before or during reaction or to the individual reactants before combining them in the slurry.

If desired, the anionic clay prepared by the process according to the invention may be subjected to ion exchange. Upon ion exchange the interlayer charge-balancing anions are replaced with other anions. Said other anions are the ones commonly present in anionic clays and include pillaring anions such as $V_{10}O_{28}^{-6}$, $Mo_7O_{24}^{6-}$. Said ion exchange can be conducted before drying or after the anionic clay formed in the slurry.

The process of the invention provides wide flexibility in preparing products with a wide range of Mg:Al ratios. The Mg:Al ratio can vary from 0.1 to 10, preferably from 1 to 6, more preferred from 2 to 4, and especially preferred to close to 3.

In one embodiment, the present invention is a process resulting in an intimate mixture of an anionic clay and another material, generally a starting component, which is performed by mixing anionic clay precursors with the other material before or at the same time as the anionic clay is being formed. If an excess of an ingredient, such as boehmite, is used a composition is prepared which contains anionic clay and also unreacted boehmite. In such composition the anionic clay and boehmite are said to be intimately mixed. This is in contradistinction to the physical mixing of separate phases of pre-existing anionic clay and boehmite.

The intimately mixed composition appears to be highly suitable for use as an additive or as a matrix for catalysts for hydrocarbon conversion. This composition appears especially suitable for sulfur removal from the gasoline and diesel fraction in FCC, $SO_x$ and $NO_x$ removal in FCC, and as a metal trap.

Magnesium sources may also be used in excess to obtain a composition comprising intimately mixed anionic clay and a magnesium compound, usually in the form of an oxide or hydroxide.

It is also possible to prepare compositions containing anionic clay, boehmite and a magnesium compound with the process according to the invention by controlling the process conditions. In said compositions the anionic clay, magnesium compound, and optionally boehmite are intimately mixed, rather than present as separate phases such as in physically mixed mixtures of anionic clay, magnesium compound and boehmite. These compositions appear to be highly suitable for use as an additive or as a matrix for catalysts for hydrocarbon conversion. These compositions appear to be especially suitable for use as a metal trap in FCC.

For some applications it is desirable to have additives, both metals and non-metals, such as rare earth metals, Si, P, B, group VI, group VIII, alkaline earth (for instance Ca and Ba) and/or transition metals (for example Mn, Fe, Ti, Zr, Cu, Ni, Zn, Mo, Sn), present. Said metals can easily be deposited on the anionic clay, the solid solution according to the invention, the composition containing boehmite and anionic clay or the composition containing anionic clay, magnesium source and optionally boehmite. They can also be added either to the alumina or magnesia source or to the slurry during preparation of the anionic clay.

The present invention is illustrated by the following examples which are not to be considered limitative by any means.

EXAMPLES

Comparative Examples Based on the State of the Art

Comparative Example 1a

A PXRD pattern was made of Vista Catapal A®. (FIG. 1(a)).

Comparative Example 1b

A PXRD pattern was made of Condea Dispersal P3® alumina. (FIG. 1(b))

Comparative Example 1c

A PXRD pattern was made for Laroche Versal 250® (FIG. 1(c)).

Comparative Example 2

A commercially available sample of anionic clay was obtained from Reheis Corporation®. Its PXRD pattern is shown in FIG. 2.

Comparative Example 3

This comparative example illustrates the co-precipitation method where Mg and Al salt solutions are added to a solution of base. (U.S. Pat. No. 3,979,523 Assignee Kyowa Chemical Industry, Japan)

A solution containing 0.04 M Of $Al(NO_3)_2.9H_2O$ and 0.08 M Of $Mg(NO_3)_2.6H_2O$ in 100 ml distilled water was added dropwise and with vigorous stirring to 150 ml of distilled water containing 0.05 M of $Na_2CO_3$ at room temperature. Mg/Al ratio of 2.0. The pH was maintained close to 10 by the addition of 3N NAOH and the resulting slurry aged overnight at room temperature. The precipitate was separated by centrifuge, washed several times with hot distilled water then dried at 65° C. overnight.

The PXRD pattern obtained from this sample is shown in FIG. 3. The results were:

| d(A) | 7.84 | 3.90 | 2.56 |
|---|---|---|---|
| $I/I_0$ | 100 | 40 | 20 |

Thermogravimetric analysis showed three weight losses: at approximately 100, 250 and 450° C. which are ascribed to loss of physisorbed water, interlayer water and loss of $CO_2$ and lattice dehydroxylation.

Examples According to the Invention

The following examples illustrate the use of Vista Catapal A®, Laroche Versal 250®, Condea P200® and Condea Disperal P3®.

Example 4

A slurry comprising 3.92 g of MgO was made in 50 ml water at 65° C. 1.80 g Vista Catapal A® was added. The mixture was kept with stirring at 65° C. for 18 hours and then dried for 18 hours at 65° C. (FIG. 4).

Example 5

A slurry of alumina was prepared by adding 13.53 g of an aluminum pseudoboehmite (Vista Catapal A®) in 53 g water (blended for 15 minutes) to a mixture of 18.24 g MgO in 19 g water (Mg:Al ratio 2.3). The resulting mixture was mixed in a blender for 15 minutes. The final pH was 9.96. The slurry was aged in a closed container at 85° C. for 48 hours. The product was dried in an oven at 100° C. (FIG. 5)

Example 6

A slurry comprising 3.92 g of MgO was made in 50 ml water at 65° C. 1.80 g Laroche Versal 250® was added. The mixture was kept with stirring at 65° C. for 18 hours and then dried for 18 hours at 65° C. (FIG. 6)

Example 7

A slurry comprising 3.92 g of MgO was made in 50 ml water at 65° C. 1.8 g Condea Dispersal P3 was added. The mixture was kept with stirring at 65° C. for 18 hours and then dried for 18 hours at 65° C. (FIG. 7)

Example 8

A slurry of alumina was prepared by adding 43.86 g of an aluminum pseudoboehmite (Condea Dispersal P3®) in 32 g water ( blended for 15 minutes) to a mixture of 27.28 g MgO in 28 g water (Mg:Al ratio 2.3). The resulting mixture was mixed in a blender for 15 minutes. The final pH was 9.17. The slurry was aged in a closed container at 85° C. for 48 hours. The product was dried in an oven at 100° C. (FIG. 8)

Example 9

A slurry comprising 3.92 g of MgO was made in 50 ml water at 65° C. 1.8 g Condea P200® was added. The mixture was kept with stirring at 65° C. for 18 hours and then dried for 18 hours at 65° C.

Example 10

A slurry comprising 3.92 g of MgO was made in 50 ml of water at 65° C. 1.8 g Condea Dispersal P3® was added. The mixture was heated in an autoclave at 185° C. for 4 hours and the product was dried for 18 hours at 65° C.

Example 11

Example 8 was repeated with the addition of 6 wt % of Ce added to the reaction mixture prior to the treatment for 18 hours at 65° C.

Example 12

Example 10 was repeated with the addition of 3 wt % V added to the reaction mixture prior to the treatment at 185° C. for 4 hours.

Example 13

Example 10 was repeated with the addition of 6 wt % Ce added to the reaction mixture prior to the treatment at 185° C. for 4 hours.

Example 14

Example 8 was repeated with the addition of 6 wt % of Ce as well as 3 wt % of V added to the reaction mixture prior to the treatment for 18 hours at 65° C.

Example 15

Example 14 was repeated with substitution of the treatment for 18 hours at 65° C. by a treatment at 185° C. for 4 hours.

What is claimed is:

1. A process for the preparation of anionic clays wherein a slurry consisting essentially of water, boehmite and magnesium oxide is reacted to obtain an anionic clay.

2. The process of claim 1 wherein the boehmite is pseudoboehmite.

3. The process of claim 1 wherein the reaction takes place at a temperature between 0 and 100° C. and at or above atmospheric pressure.

4. The process of claim 1 wherein the reaction takes place at a temperature above 50° C. and at or above atmospheric pressure.

5. The process of claim 1 wherein the reaction is conducted at a temperature above 100° C. and at an increased pressure.

6. The process of claim 1 wherein a first slurry consisting essentially of water and boehmite is combined with a second slurry consisting essentially of water and magnesium oxide.

7. The process of claim 6 wherein the process is carried out in a continuous mode.

8. The process of claim 1 wherein the anionic clay is subjected to an ion-exchange treatment.

9. The process of claim 1 wherein the anionic clay is ion exchanged with pillaring anions⁻.

10. The process of claim 9 wherein said pillaring anions comprise $V_{10}O_{28}^{6-}$, $Mo_7O_{24}^{6}$, or mixtures thereof.

11. The process of claim 1 wherein metals or non-metals are deposited on the anionic clay.

12. A process for the preparation of a Al—Mg-containing solid solution and/or spinel, wherein an anionic clay obtained by the process of claim 1 is subjected to a heat-treatment at a temperature between 300 and 1200° C.

* * * * *